(12) United States Patent
Chvojcsek et al.

(10) Patent No.: US 7,403,375 B1
(45) Date of Patent: Jul. 22, 2008

(54) ADJUSTABLE LCD SCREEN ASSEMBLY FOR WRITING MACHINE

(75) Inventors: Frank John Chvojcsek, West Dundee, IL (US); Dennis John Kras, Des Plaines, IL (US)

(73) Assignee: Stenograph L.L.C., Mount Prospect, IL (US)

( * ) Notice: Subject to any disclaimer, the term of this patent is extended or adjusted under 35 U.S.C. 154(b) by 232 days.

(21) Appl. No.: 11/140,155

(22) Filed: May 27, 2005

(51) Int. Cl.
*H05K 5/00* (2006.01)
*G06F 3/02* (2006.01)
*B41J 3/26* (2006.01)
*H04N 1/024* (2006.01)

(52) U.S. Cl. .......................... 361/681; 345/169; 400/94; 178/21

(58) Field of Classification Search ... 312/223.1–223.2; 361/681; 345/169, 905; 248/917–923; 349/58, 349/65; 400/91, 94; D18/20; 178/21
See application file for complete search history.

(56) References Cited

U.S. PATENT DOCUMENTS 5,203,635 A * 4/1993 Freedman .................... 400/91
6,532,628 B2 * 3/2003 Kim .............................. 16/342

* cited by examiner

*Primary Examiner*—Jayprakash N Gandhi
*Assistant Examiner*—Zachary M Pape
(74) *Attorney, Agent, or Firm*—McDermott Will & Emery LLP

(57) ABSTRACT

The adjustable LCD screen assembly for a writing machine includes base and an LCD screen assembly coupled to each other by a hinge assembly. An embodiment of the hinge assembly includes a pivot post and a pair locking set screws, Bellville spring washers, a screw, an anti-rotation washer, a first bracket and a second bracket. The hinge assembly mounts to the base along the first bracket and to the LCD screen assembly along the second bracket. The hinge assembly utilizes a compression mechanism including a spring mechanism to generate frictional force between the elements of the hinge assembly to hold the LCD screen assembly in place with respect to the base under "static conditions," yet allows for infinite adjustability of the LCD screen assembly, within a given range of motion, under "pivoting conditions."

6 Claims, 2 Drawing Sheets

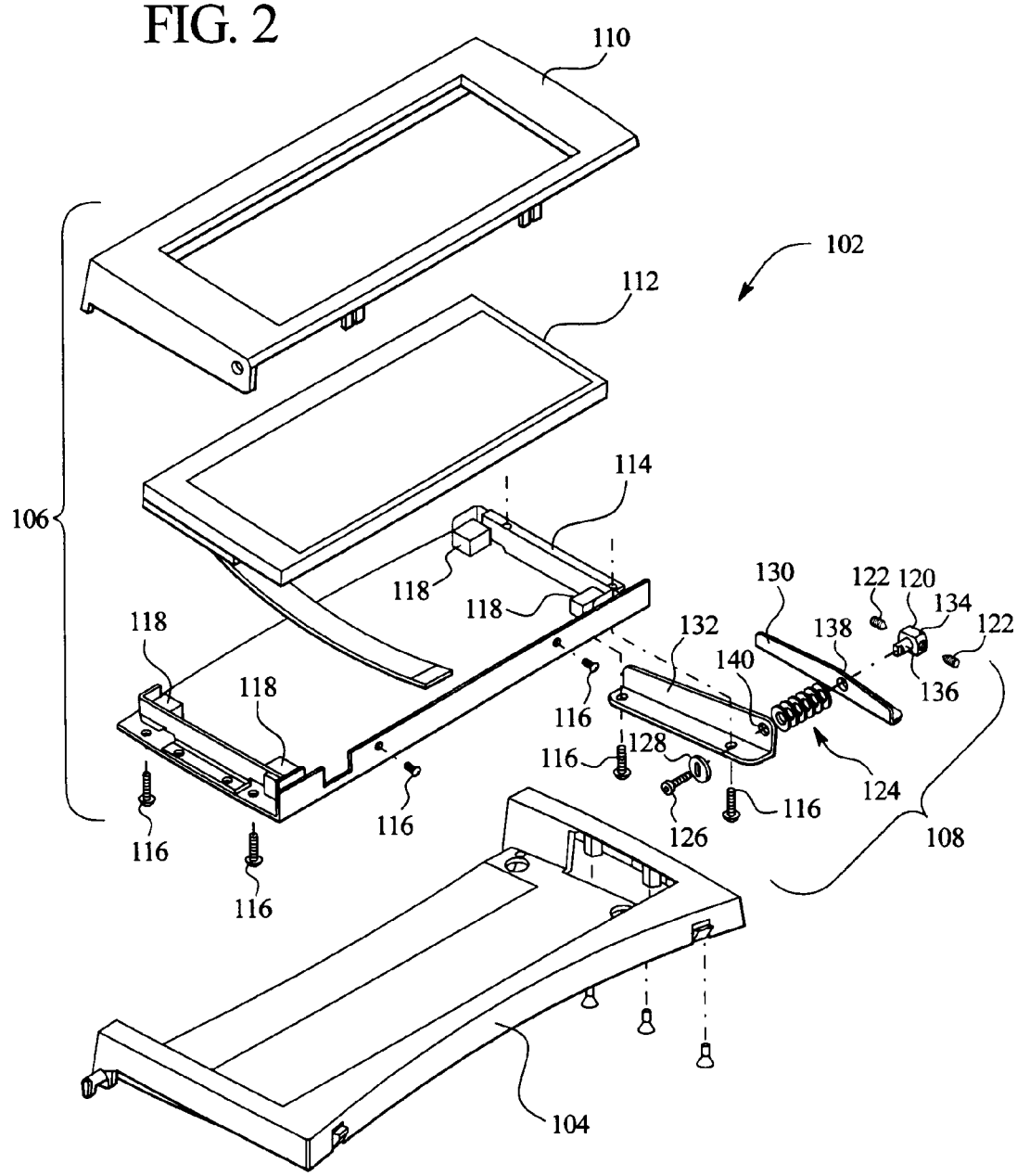

ADJUSTABLE LCD SCREEN ASSEMBLY FOR WRITING MACHINE

FIELD OF THE INVENTION

The present invention relates to an adjustable LCD screen assembly. More specifically, the subject matter relates to an adjustable LCD screen assembly for writing machines that provides infinite adjustability within a range of operating positions.

BACKGROUND OF THE INVENTION

Stenographic writing machines have been used for transcription for many years. A typical stenographic writing machine contains a keypad for shorthand writing and either a paper-based or liquid crystal display ("LCD") for viewing the written transcript. The keypad on a stenographic writing machine usually consists of a few keys which are associated with shorthand phrases and/or symbols. Typically, a stenographer uses the writing machine to transcribe conversations made in a legal forum.

A stenographic writing machine can be electronically or mechanically powered. Some electronic stenographic writing machines have LCD screens for easy display. An electronic display saves on the cost of paper and ink necessary for paper based stenographic writing machines. The electronic LCD display further provides for an ease of reviewing and correcting stenographic transcripts.

Currently, neither paper-based nor LCD writing machines have adjustable displays. Accordingly, it is desirable to provide an LCD screen assembly that is adjustable, easy to use, and provides various operating positions for the user.

SUMMARY OF THE INVENTION

The adjustable LCD screen assembly for a writing machine includes base and an LCD screen assembly coupled to each other by a hinge assembly. An embodiment of the hinge assembly includes a pivot post and a pair locking set screws, Bellville spring washers, a screw, an anti-rotation washer, a first bracket and a second bracket. The hinge assembly mounts to the base along the first bracket and to the LCD screen assembly along the second bracket. The hinge assembly utilizes a compression mechanism including a spring mechanism to generate frictional force between the elements of the hinge assembly to hold the LCD screen assembly in place with respect to the base under "static conditions," yet allows for infinite adjustability of the LCD screen assembly, within a given range of motion, under "pivoting conditions."

An advantage of the present invention is to provide an adjustable LCD screen for stenographic writing machines.

It is another advantage to provide an LCD screen that may be infinitely adjusted within a range of operating positions.

It is a further advantage to provide an infinitely adjustable LCD screen that maintains its static condition under operating conditions.

Additional advantages and novel features of the examples will be set forth in part in the description which follows, and in part will become apparent to those skilled in the art upon examination of the following and the accompanying drawings or may be learned by production or operation of the examples. The objects and advantages may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitation. In the figures, like reference numbers will refer to the same or similar elements.

FIG. 2 is an isometric assembly view of the adjustable LCD screen shown in FIGS. 1A and 1B.

DETAILED DESCRIPTION

Figure 1A:
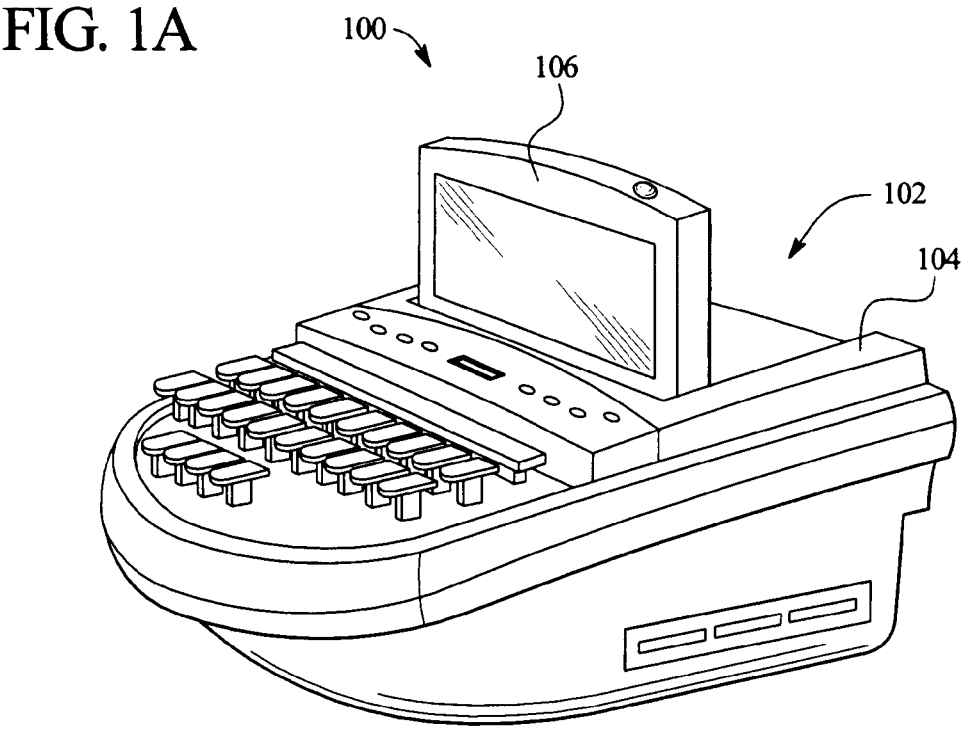
FIG. 1A is an isometric view of a stenographic writing machine with an adjustable LCD screen assembly.
Figure 1B:
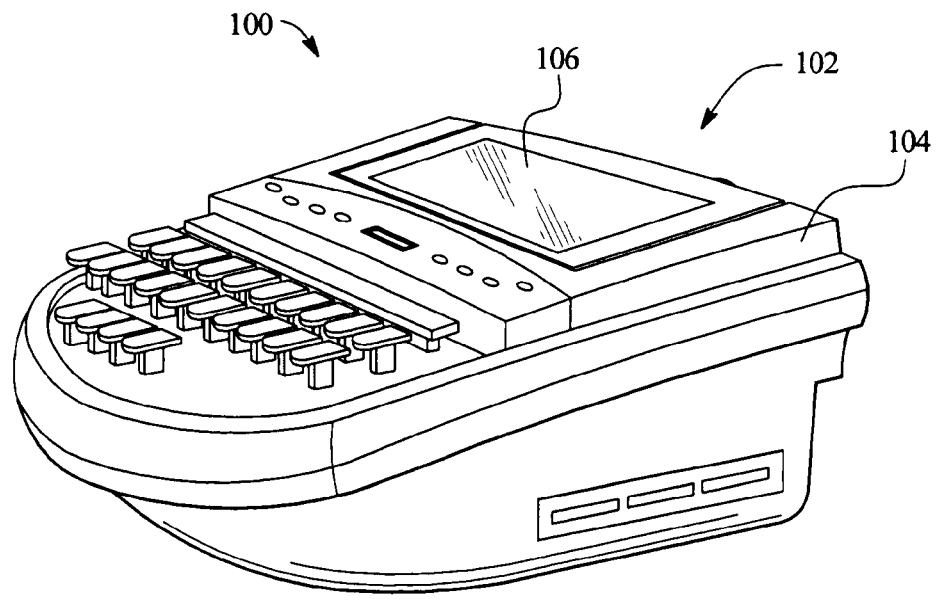
FIG. 1B is an isometric view of the stenographic writing machine shown in FIG. 1A with the LCD screen positioned at zero degrees with respect to the machine.

FIGS. 1A and 1B illustrate a stenographic writing machine 100 including an adjustable display assembly 102. The adjustable display assembly 102 shown in FIGS. 1A and 1B includes a base 104 and an LCD screen assembly 106 coupled to each other by a hinge assembly 108, described further below with reference to FIG. 2. The adjustable display assembly 102 is described herein as including an LCD screen; however, it is contemplated that the adjustable display assembly 102 may include a display screen other than an LCD screen.

As shown in FIGS. 1A and 1B, the LCD screen housing 106 may be adjusted to be positioned at any angle between zero and ninety degrees with respect to the stenographic writing machine 100, as described further herein. Alternately, the LCD screen assembly 106 may be adapted to be adjustable within other ranges of angles, such as, for example zero and one hundred twenty degrees. Moreover, it is contemplated that the hinge assembly 108 described herein may be implemented in conjunction with other devices, such as, for example, laptop computer screens.

The adjustable display assembly 102 is shown in FIG. 2. As shown in FIG. 2, the adjustable display assembly 102 includes the base 104, the LCD screen assembly 106 and the hinge assembly 108. The base 104 may be a part of the stenographic writing machine 100 or it may be a separate element attached thereto. The LCD screen assembly 106 shown in FIG. 2 includes a face plate 110, an LCD screen 112 and a back plate 114. When assembled, the LCD screen 112 is enclosed between the face plate 110 and the back plate 114. As shown in FIG. 2, the face plate 110 and the back plate 114 are attached to each other using mounting screws 116. It is understood that the number and location of the mounting screws 116 may be altered to accommodate various configurations of the LCD screen assembly 106. Moreover, as illustrated in FIG. 2, multiple pieces of foam padding 118 may be used to protect the LCD screen 112 from being damaged as the stenographic writing machine 100 is transported or used. Alternately, other configurations of the foam padding 118 or other materials may be employed to protect the LCD screen 112.

In the embodiment of the adjustable display assembly 102 shown in FIG. 2, two of the mounting screws 116 are further used to secure the hinge assembly 108 to the LCD screen assembly 106. Similarly, the hinge assembly 108 is separately secured to the base 104. The hinge assembly 108 shown in FIG. 2 includes a pivot post 120 and a pair locking set screws 122, Bellville spring washers 124, a screw 126, an anti-rotation washer 128, a first bracket 130 and a second bracket 132. The hinge assembly 108 mounts to the base 104 along the first bracket 130 and to the LCD screen assembly 106 along the second bracket 132. The hinge assembly 108 utilizes a compression mechanism including a spring mechanism to generate frictional force between the elements of the hinge assembly 108 to hold the LCD screen assembly 106 in place with respect to the base 104 under "static conditions," yet allows for infinite adjustability of the LCD screen assembly 106, within a given range of motion, under "pivoting conditions," as described further below.

The pivot post 120 shown in FIG. 2 has a flat-sided head portion 134 and a generally cylindrical portion 136 for mating with the anti-rotation washer 128. The generally cylindrical portion 136 and the anti-rotation washer 128 have corresponding mating portions to prevent each from rotating independently of the other. In the embodiment shown in FIG. 2, the corresponding mating portions are a rectangular protrusion at the end of the generally cylindrical portion 136 and a rectangular shaped aperture in the anti-rotation washer 128. However, it is understood that other configurations of the generally cylindrical portion 136 and the anti-rotation washer 128 will accomplish the goals described herein.

When assembled, the generally cylindrical portion 136 of the pivot post 120 passes through an opening 138 in the first bracket 130, through the Bellville spring washers 122 and through an opening 140 in the second bracket 132 to mate with the anti-rotation washer 128. The generally cylindrical portion 136 of the pivot post 120 is internally threaded to mate with the screw 126, which is tightened into the pivot post 120 to create a compressive force on each of the elements of the hinge assembly 108 located between the pivot post 120 and the screw 126, as further described below. The pair locking set screws 122 thread into the flat-sided head portion 134 of the pivot post 120 to hold the screw 126 in place and maintain a consistent compressive force between the pivot post 120 and the screw 126 over time and use. In the embodiment shown in FIG. 2, the flat-sided head portion 134 of the pivot post 120 sits flush against the flange of the first bracket 130 further ensuring the pivot post 120 will not rotate causing a loss of consistency in the compressive force.

The Bellville spring washers 124 shown in FIG. 2 are six spring washers stacked with their faces aligned in the same direction. This configuration of the Bellville spring washers 124 provides approximately four hundred fifty pounds of spring force. The Bellville spring washers 124 exhibit different spring characteristics when stacked with opposing faces or when the faces point the same direction. Any combination of a greater or lesser number of the Bellville spring washers 124 in any arrangement and orientation may be used to achieve the desired spring characteristics for a given application. Alternatively, any material exhibiting spring characteristics, such as, for example, a compression spring, may be used in place of the Bellville spring washers 124.

Accordingly, the engagement of the pivot post 120 and the screw 126 creates a compressive force that is resisted by the compression resistance of the Bellville spring washers 124. The opposing forces create friction along the contact surface between the elements of the hinge assembly 108 to hold the LCD screen assembly 106 in a static position with respect to the base 104. In the embodiment shown in FIG. 2, it has been found that when the screw 126 is driven into the pivot post 120 using approximately 10 inch-pounds of torque sufficient friction is generated to hold the LCD screen assembly 106 in place when no external pivoting force is applied, yet also allows the LCD screen assembly 106 to be adjusted by the user by applying an external pivoting force. However, it is contemplated that other configurations of the adjustable display assembly 102 may require more or less friction to hold the LCD screen assembly 106 in place when no external pivoting force is applied, yet also allow the LCD screen assembly 106 to be adjusted by the user. It is understood that the pivoting forces generated by the static and operating conditions of the adjustable display assembly 102 are not "external pivoting forces." The pivoting condition of the adjustable display assembly 102 may be designed to occur when the forces applied to the LCD screen assembly 106 exceed the forces generated under operating conditions. As a result, the operation of the stenographic writing machine 100 will not cause the LCD screen assembly 106 to pivot. An example of an external pivoting force is a pivoting force generated by a user that grasps and intentionally rotates the LCD screen assembly 106. Because the hinge assembly 108 relies on friction to hold the LCD screen assembly 106 in place, the LCD screen assembly 106 is infinitely adjustable within the range of pivoting motion.

Referring back to FIGS. 1A and 1B, an embodiment of the adjustable display assembly 102 in which the LCD screen assembly 106 is infinitely adjustable between zero and ninety degrees with respect to the stenographic writing machine 100 is illustrated. As described above, a user may position the LCD screen assembly 106 at any angle within this range simply by grasping the LCD screen assembly 106 and applying sufficient force to pivot the LCD screen assembly 106 to the desired position. Once the user releases the pivoting force, the LCD screen assembly 106 maintains its position under operating or other static conditions. Of course, the configuration of the stenographic writing machine 100 and the adjustable display assembly 102 may be adapted to provide for a greater or lesser range of motion. Moreover, the adjustable display assembly 102 may be adapted for use with computer screen or any other device having a display or other pivoting element.

In an alternative embodiment of the stenographic writing machine 100 including an adjustable display assembly 102, the adjustable screen assembly 102 may incorporate an element other than the hinge assembly 108 for controlling the position of the adjustable screen assembly 102. For example, the friction required to hold the adjustable screen assembly 102 in position may be provided by a clamp assembly, a ratcheting assembly, a slotted assembly, a locking nut, etc. For example, the adjustable screen assembly 102 may employ a clamp assembly with preset detents for holding the adjustable screen assembly 102 in one or more predetermined fixed positions with respect to the stenographic writing machine 100.

While the foregoing has described what is considered to be the best mode and/or other examples, it is understood that various modifications may be made therein and that the technology discussed herein may be implemented in various forms and examples, and that they may be applied in numerous applications, only some of which have been described herein.

What is claimed is:

1. An adjustable display assembly comprising:
   a base;
   a screen housing; and
   a hinge pivotally securing said screen housing to said base, wherein said hinge includes a compression mechanism including a spring mechanism, wherein the compression mechanism exerts a compressive force against the spring mechanism such that the friction generated by the opposing forces prevents said screen housing from pivoting with respect to said base when no external pivoting force is applied to said screen housing and allows said screen housing to pivot with respect to said base when an external pivoting force is applied to said screen housing, wherein said spring mechanism includes one or more Bellville spring washers.

2. The adjustable display assembly of claim 1 wherein said spring mechanism provides approximately four hundred fifty pounds of spring force.

3. The adjustable display of claim 1 wherein said compression mechanism includes a pivot post that mates with an anti-rotation washer, a screw coupling said pivot post and said anti-rotation washer, one or more locking screws for locking said screw within said pivot post, a plurality of Bellville spring washers located between said pivot post and said anti-rotation washer and a first bracket and a second bracket held between said pivot post and said anti-rotation washer.

4. A hinge assembly comprising:
a compression mechanism including a first bracket, a second bracket and a spring mechanism, wherein said compression mechanism exerts a compressive force against said first bracket, said second bracket and said spring mechanism such that said first bracket and said second bracket are held in a static relationship with respect to each other unless a force is applied to the hinge assembly to exceed the frictional resistance between said first bracket, said second bracket and said spring mechanism, wherein said spring mechanism is one or more Bellville spring washers.

5. The hinge assembly of claim 4 wherein said compression mechanism includes a pivot post that mates with an anti-rotation washer, a screw coupling said pivot post and said anti-rotation washer, one or more locking screws for locking said screw within said pivot post, a plurality of Bellville spring washers located between said pivot post and said anti-rotation washer and a first bracket and a second bracket held between said pivot post and said anti-rotation washer.

6. A stenographic writing machine with an adjustable display comprising:
a stenographic writing machine; and
a screen assembly, wherein said screen assembly is held in one of three or more positions with respect to said stenographic writing machine by a hinge assembly comprising a compression mechanism including a spring mechanism, wherein said hinge assembly holds said screen assembly in a static relationship with respect to said stenographic writing machine unless a force is applied to the hinge assembly that exceeds the frictional resistance of said hinge assembly, wherein said hinge assembly includes a pivot post that mates with an anti-rotation washer, a screw coupling said pivot post and said anti-rotation washer, one or more locking screws for locking said screw within said pivot post, a plurality of Bellville spring washers located between said pivot post and said anti-rotation washer and a first bracket and a second bracket held between said pivot post and said anti-rotation washer.

* * * * *